United States Patent [19]

Kandelman

[11] Patent Number: 4,651,781
[45] Date of Patent: Mar. 24, 1987

[54] DISTRIBUTED ACCUMULATOR

[75] Inventor: Allen Kandelman, Granada Hills, Calif.

[73] Assignee: Northrop Corporation, Hawthorne, Calif.

[21] Appl. No.: 762,587

[22] Filed: Aug. 2, 1985

Related U.S. Application Data

[63] Continuation-in-part of Ser. No. 576,523, Feb. 2, 1984, abandoned.

[51] Int. Cl.[4] ............................................. F15B 1/04
[52] U.S. Cl. ....................................... 138/30; 138/26; 138/28
[58] Field of Search ...................... 138/26, 28, 30, 722; 220/85 B

[56] References Cited

U.S. PATENT DOCUMENTS

| 332,402 | 12/1885 | Leadley | 138/28 |
| 1,304,036 | 5/1919 | Eshelby | 138/28 |
| 2,841,237 | 7/1958 | Slayter | 181/252 |
| 2,852,033 | 9/1958 | Orser | 138/30 |
| 3,665,967 | 5/1972 | Kachnik | 138/26 X |
| 4,314,621 | 2/1982 | Hansen | 181/233 |

FOREIGN PATENT DOCUMENTS

| 192956 | 2/1923 | United Kingdom | 138/28 |
| 2115488 | 9/1983 | United Kingdom | 138/28 |

Primary Examiner—James E. Bryant, III
Attorney, Agent, or Firm—Terry J. Anderson; Robert B. Block

[57] ABSTRACT

A distributed accumulator integral constructed to form a hydraulic line for interconnecting components. The accumulator includes a non-porous flexible convoluted inner tube resiliently supported in a closed-cell, plastic foam shell, both being supported in a structural tubing member serving as containment piping.

6 Claims, 8 Drawing Figures

U.S. Patent    Mar. 24, 1987    4,651,781
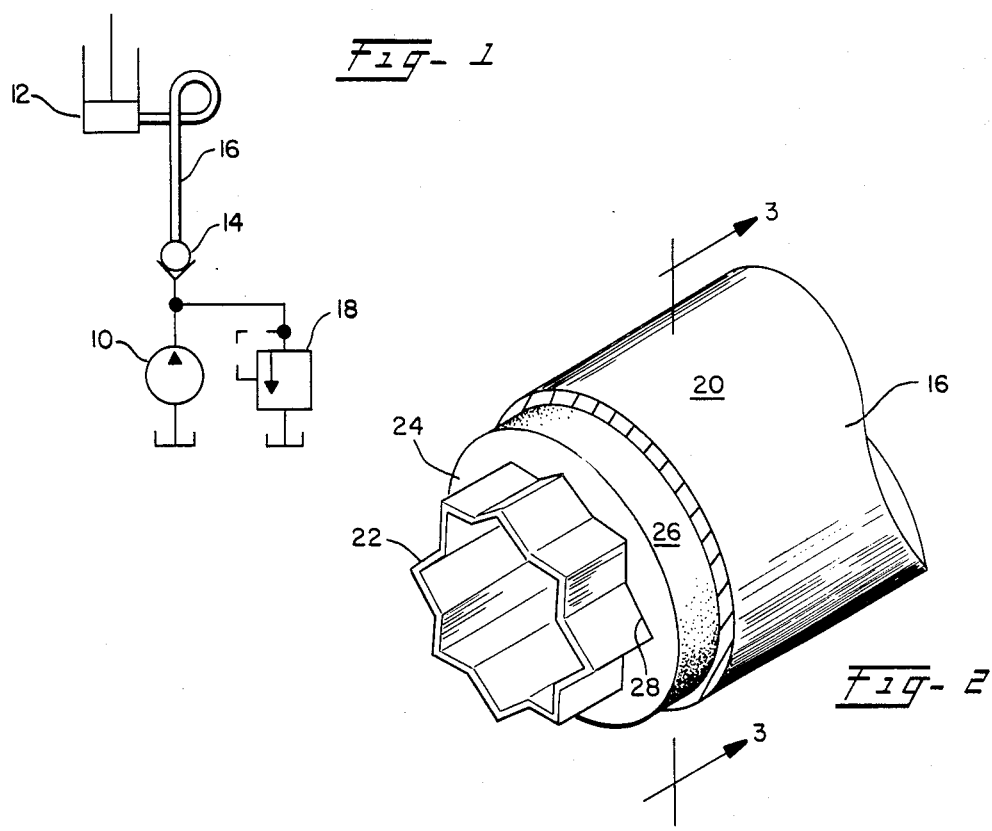
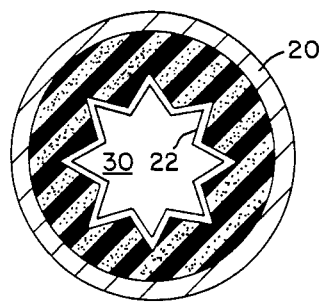 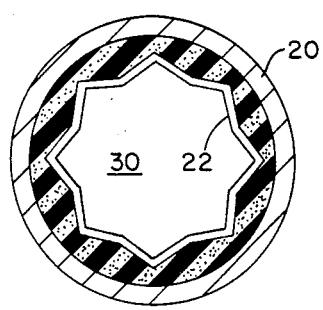 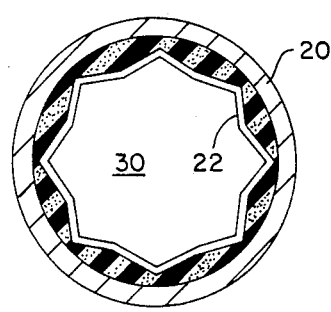
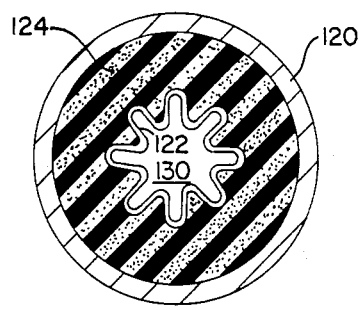 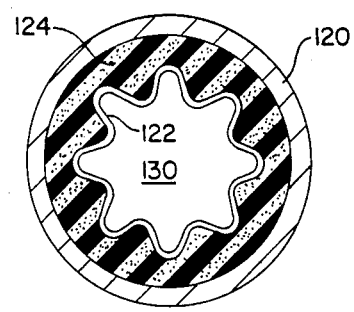 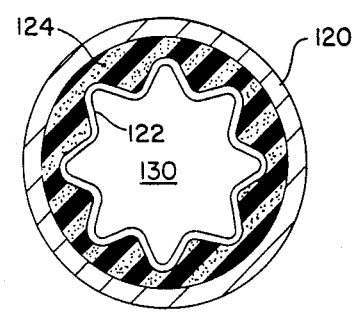

4,651,781

DISTRIBUTED ACCUMULATOR

CROSS REFERENCES TO RELATED APPLICATION

This application is a continuation-in-part of my prior U.S. application, Ser. No. 576,523 entitled DISTRIBUTIVE ACCUMULATOR, filed Feb. 2, 1984, now abandoned.

BACKGROUND OF THE INVENTION

The present invention relates to accumulators for the absorption of shock pulses and the suppression of pressure pulses and surges in hydraulic systems and more particularly to an in-line pressure accumulator designed as an integral part of the construction of hydraulic lines interconnecting components in such systems.

Pressure pulses generated by valve closures and component operation in high pressure hydraulic systems cause shock and other high energy disturbances and oscillations (often referred to as water hammer) which can rupture lines and otherwise cause piping and component failure. Such pressure surges often cause physical movements of system piping and components and their support structures.

Accumulators to suppress such pressure surges and component movement have been known. An in-line type pressure and volume accumulator is shown in U.S. Pat. No. 2,677,393 which used a radially convoluted, elongate, self supporting cylinder made of strips of dismetal sheet suitably joined together to form the containment member or pipeline. But the structure was not suitable for high pressure operation and was not suitably strong or supported and contained. U.S. Pat. No. 3,665,967 proposes the use of an elastomeric stretchable inner tube supported in a closed cell foam encased in a flexible hose. Such a stretchable inner tube is, however, unreliable since its section is significantly reduced when stretched and the combination of high internal pressure and stretching through repeated cycling can cause rupture of the inner tube. Use of a bellows similar to U.S. Pat. No. 2,677,399 has been proposed in U.S. Pat. No. 4,500,487 for a one-shot energy absorber in which a longitudinal bellows is mounted in a crushable metallic foam support. Such a system is used as a safety feature in nuclear reactors to prevent a pressure surge so high so as to rupture the piping system and result in leak or discharge of radioactive coolants. However, U.S. Pat. No. 4,500,487 does not address continuously operating accumulators such as in aircraft hydraulic systems. None of these prior art proposals satisfies the need for a an accumulator for ongoing use as part of an aircraft hydraulic system requiring only occasional maintenance.

Discrete accumulators have, of course, been used to solve this and similar problems and often have been used in multiples to be inserted at predetermined locations in a fluid-flow system. However, such accumulators' primarily function is as reservoirs, are heavy, and have been designed for use at lower pressures for pump output smoothing. But, for very high pressures, 3,000 psi, an improved structure is required.

SUMMARY OF THE INVENTION AND OBJECTS

In general, it is an object of the present invention to provide an accumulator for use in hydraulic systems which is distributed as an integral part of at least a portion of the hydraulic fluid line of a system.

Another object of the invention is to provide an accumulator of the above character which attenuates ripple, shock, noise and oscillations in hydraulic systems and is also available to store fluid energy under pressure in the system by being distributed through and an integral part of the structure of the system hydraulic lines.

The present invention employs the use of an accumulator which stores the energy of fluid under pressure along the length of the fluid lines rather than at isolated discrete locations. Thus, the hydraulic line itself attenuates and controls oscillations, noise, ripple shock and the like throughout the system so that pulses and surges of fluid are attenuated proximate to the operating component that causes them to provide more effective damping operation.

In general, the present invention became necessary in the development of very high pressure hydraulic systems such as are contemplated for use in future aircraft. Various requirements regarding the properties of hydraulic systems in aircraft have resulted in a specification for a modified fluid mainly composed of chlorotrifluoroethylene (CTFE) liquid polymer or other solid fluorocarbon plastic having a specific gravity of about 2.1 g/l. This heavy fluid has properties which makes it valuable for aircraft applications, but its weight is a disadvantage, which is kept to a minimum by increasing system pressure and reducing system volume. It would be desirable to reduce or eliminate the weight of discrete accumulators and to dampen pressure pulses close to the point of origin as is accomplished with the present invention.

Preferably, in accordance with the present invention, a flexible inner member having a convoluted exterior is supported in a closed cell foam insert contained within an outer mountable tubular piping support member. The insert, inner tube, is formed with longitudinal convolutions which are reentrant in radial cross section. The closed cell foam support member is similarly configured. In operation, the fluid is contained entirely within the inner member which is free to expand to the limit of the outer member subject only to the resistance of a shell of closed cell foam. Ideally the closed cell foam is filled with air or other gas which is compressed under the indicated pressures. Since the foam is closed cell shock waves do not as readily pass along. Furthermore, since the system is yieldable, shock or a pressure surge at one location is readily converted into stored energy by compression of the foam. After pressure surge is passed the foam restores the inner member to a smaller configuration by decompression.

The distributed accumulators, according to the present invention, are usable in aircraft hydraulic systems, as well as the usual systems for operating presses, power brakes and equipment handling devices where shock pulse or noise attenuation and oscillation due to component operation is essential to eliminate.

The distributed accumulator of the present invention, in addition to performing the functions of prior art accumulators, substantially reduces the magnitude of shock transmission and vibrations throughout the system and thus improves system performance. By operating with a controlled enlargement and reduction of the volume of the fluid-flow lines themselves the shock transmission and propagation of fluid pressure pulses and noise are reduced to a satisfactory level.

While it is a further object of the invention to provide a distributed accumulator which is preferably integral in the structure of the hydraulic lines of the system, it will be appreciated that it still may be necessary and desirable to include standard accumulators of a reduced number or somewhat different character in order to design a complete hydraulic system.

BRIEF DESCRIPTION OF THE DRAWINGS

FIG. 1 shows a schematic illustration of a pressure compensation hydraulic circuit incorporating a distributed accumulator constructed in accordance with the present invention.

FIG. 2 is an isometric perspective view partially broken away and partially in section of a distributed accumulator constructed in accordance with the invention and having a star shaped inner tube.

FIG. 3 is a diagrammatic cross sectional view taken at the line 3—3 of FIG. 2 showing the accumulator in an unpressurized state.

FIG. 4 is a diagrammatic cross sectional view similar to FIG. 3 showing partial expansion of the inner tube.

FIG. 5 is a diagrammatic cross sectional view similar to FIG. 3 showing the inner tube near complete expansion thereof.

FIG. 6 is a diagrammatic cross sectional view similar to that shown in FIG. 3 showing an alternative embodiment using a second reentrant design inner tube structure constructed in accordance with the present invention.

FIG. 7 is a diagrammatic cross sectional view of FIG. 6 showing partial expansion of the inner tube thereof.

FIG. 8 is a diagrammatic cross sectional view of FIG. 6 showing nearly complete expansion thereof.

DETAILED DESCRIPTION OF THE PREFERRED EMBODIMENTS

Referring now to FIG. 1, there is shown an abbreviated pressure control system having several components of a typical working system. Thus, a pump 10 works into a piston actuated device 12 through a check valve 14 and a system hydraulic line accumulator 16 connecting the check valve to the pump 10 and adjustable relief valve 18 may be provided to bypass the pump in a known manner. The hydraulic line 16 is constructed to form the distributed accumulator in accordance with the present invention and is shown in greater detail in FIG. 2.

In general, the structure of the distributed accumulator 16 is illustrated by a segment taken out and broken away, the remainder being of substantially identical construction. As will be noted from FIG. 1, the overall structure of accumulator 16 is sufficiently flexible that it can be laid along, through and around the required paths in the aircraft.

As shown, the section comprises three elements: an outer tubular structural member 20 of cylindrical cross section within which is mounted the non-porous non-elastomeric tubular fluid-flow inner member 22 compressible in a foam shell or support 24. Inner member 22 is formed of a sheet material capable of flexing in any manner but may be substantially non-stretchable. Whether it is inherently stretchable or not is not a feature used or relied on in the present invention since it is configurationally flexible and large enough without stretching to reach the full extent of the inside bore of the support tubing. The inner member is configured with reentrant convolutions as seen in transverse cross-section which form convolutions extending longitudinally throughout the length of the member to define longitudinal ridges separated and interspersed between longitudinal troughs. The ridges and troughs may be either creased so that star-shape configuration is achieved as shown in FIGS. 2 through 5 or in the alternative embodiment, shown in FIGS. 6 through 8, or may be of a more rounded character to form a rosette. While not essential, usually the inner fluid-flow member will be of sufficient strength to be self supporting and will assume the shape which has been imparted to it and which is shown. The inner member may be made of any suitable non-porous, non-stretchable sheet material which is non-reactive sheet and compatible chemically with the fluid being used. Nylon is satisfactory at a thickness of 0.025"–0.075" and preferably about 0.060".

The inner fluid-flow member may be constructed of any other suitable plastic sheet such as polytetrafluoroethylene (Teflon, Trademark of E. I. Du Pont de Nemours & Co., Inc.) or other solid fluorocarbon plastic composite with a nylon or Teflon inner lining and is impervious to the action of the hydraulic fluid being contained. Of course, if it is a water system the restrictions would be quite minimal compared to a hydraulic system using organic compounds.

Means is provided to support the inner fluid-flow member and consists of a shell 24 of compressible foam material shaped to form a structure having a substantially tubular configuration with a relaxed exterior periphery 26 shaped to conform to the inside of the outer structural member 20. This shell is provided with a relaxed inner periphery 28 bounded by the design shape of the relaxed exterior configuration of the inner fluid-flow member, which is star-shaped as shown in FIGS. 2-5.

The compressible support shell is made of a resilient material capable of being radially compressed and expanded outwardly by forces from within and by forces exerted through the inner tubular member 22 when the latter is passing fluid under high pressure. Preferably, the shell is made of an elastomeric foam defining a closed cell air-filled structure, such as neoprene. The cell void-to-solids ratio should be high. The cell size is not critical but will best be in the range of about 1/16"–1/32". It need not have inner or outer skin.

The outer tubular member is preferably of cylindrical cross section as, for example, right cylindrical configuration and is made of any suitable metal or plastic capable of withstanding the pressures of use. An example would be steel, titanium or aluminum tubing of a suitable cross-section.

FIGS. 3-5 show the distributed accumulator of FIG. 2 in various states of operation. FIG. 3 shows the substantially relaxed state wherein the hydraulic fluid 30 contained within the inner tube is at low pressure below that which would cause substantial flexing of the structures. FIG. 4 shows partial expansion of inner tube 22 and compression support of structure 24 in response to slight excess pressure, while FIG. 5 shows a significant expansion of inner tube 22 and nearly complete compression of the support structure 24.

It will be noted that the system volume rate of change for an incremental radial change in expansion increases as the radial portion of the members 22, 24 is expanded. This represents a desirable increase in the system over pressure capacity at increasing pressures and is inherent in the present design.

The inner tube is configured with a maximum achievable radial dimension at least as great as the inner dimension of the outer containment tube so that no condition will arise that significantly stresses the inner tube by stretching. The foam support shell is yieldably compressed and recovers as any over-pressure surge is experienced. The foam shell resists compression by the air or gas it has entrapped in the closed cells, the latter gas compression becomes the most useful resisting and restoring force through most of the range of operation.

In general, the accumulator of this invention reacts early in response to system pressure and may usually be found in a state similar to FIG. 4. FIG. 3 states are usually achieved when the system is not operating while FIG. 5 states are achieved during over-pressure.

The configuration shown, using six to eight convolutions, is satisfactory for 1½"–3" i.d. of member 20 and may be increased if larger diameter construction is specified. The relaxed inner linear surface dimension of member 22 should be at least about ¾ times the diameter of the outer member so that it cannot be stretched during operation. The foam support member carries the inner member at about ½ the radius of the outer member and preferable in the range of ¼–¾ of the outer member.

FIGS. 6 through 8 show an alternative embodiment of the invention in which like parts have been given the same reference numerals raised by 100. Thus, the inner member 122 is now given a more general shape resembling a rosette body, in cross-section, resembling a central main passage with expandable peripheral petals of a rosette. The operation of the embodiment of FIGS. 6–8 is the same as that of FIGS. 2–5. In both the embodiments, the pressure should be equalized between the inside and the outside of the shell. Under this condition the foam shell looks to the system more like a compressible fluid, especially at high operating pressures, i.e. above 3,000 psi.

What is claimed is:

1. A distributed accumulator for use in a hydraulic system for connecting operative components of the systems together and for attenuating pressure surges and oscillations within said system comprising
   an outer tubular, structural member defining an inner surface,
   a non-porous, tubular inner member formed of plastic sheet material, said inner member being configured with a relaxed shape having radially reentrant convolutions extending longitudinally of said member forming a plurality of longitudinal ridges separated by interspersed longitudinal troughs so that said inner member can be repeatedly expanded and contracted by flexing without stretching,
   said inner member having an expanded cross-section at least as large as the inner surface of said outer member,
   a resilient, compressible tubular support shell made of a closed cell foamed elastomeric material disposed inside said outer member and shaped to form a structure having a relaxed outer periphery conforming to the inside of said outer member and a relaxed inner periphery shaped to conform to and support the relaxed shape of said inner member,
   said inner member being disposed within and supported by said support shell, the outer circumference of said inner member, when supported in said support shell, being radially spaced inwardly from the inner surface of said outer member,
   said inner member, when stressed by internal pressure, radially expanding by flexing to a stressed configuration of greater cross-sectional area and against the return force developed by compression of said shell, said shell's closed cell structure maintaining the effect of the compression within a local region, and thereafter, in response to reduction of pressure, recovering its original configuration and cross-section by application of the return force of said resilient foam shell.

2. The accumulator as in claim 1 in which said inner member is shaped in the form of a star in cross section.

3. The accumulator as in claim 1 in which said inner member is shaped in the form of a rosette in cross-section.

4. The accumulator as in claim 1 in which the released shape of the inner tube and inner wall of the support structure is about ¼–¾ that of the outer structural member.

5. The accumulator as in claim 1 in which the closed cell foam is neoprene.

6. The accumulator as in claim 1 in which said inner member convolutions have a ridge-to-trough depth extending from one-fourth to three-fourths of the internal radius of the structural member.

* * * * *